United States Patent [19]
Uzzell

[11] Patent Number: 6,164,733
[45] Date of Patent: Dec. 26, 2000

[54] HYDRAULIC BRAKING SYSTEMS

[75] Inventor: Robert George Uzzell, Redditch, United Kingdom

[73] Assignee: Lucas Industries public limited company, United Kingdom

[21] Appl. No.: 09/412,705

[22] Filed: Oct. 5, 1999

Related U.S. Application Data

[63] Continuation of application No. PCT/GB98/00957, Apr. 1, 1998.

[30] Foreign Application Priority Data

Apr. 5, 1997 [GB] United Kingdom .................... 9706955

[51] Int. Cl.[7] ....................................................... B60T 8/88
[52] U.S. Cl. ............................................. 303/122; 303/155
[58] Field of Search ........................... 303/122, DIG. 11, 303/3, 115.2, 156, 115.4, 115.1, 114.1, 114.2, 122.09, 155

[56] References Cited

U.S. PATENT DOCUMENTS

| | | |
|---|---|---|
| 4,425,005 | 1/1984 | Warwick . |
| 4,865,398 | 9/1989 | Takeuchi et al. ..................... 303/115.2 |
| 5,246,283 | 9/1993 | Shaw et al. ........................... 303/115.2 |
| 5,603,217 | 2/1997 | Majersik et al. . |
| 5,609,401 | 3/1997 | Johnston et al. ........................ 303/155 |

*Primary Examiner*—Christopher P. Schwartz
*Assistant Examiner*—Melanie Talavera
*Attorney, Agent, or Firm*—MacMillan, Sobanski & Todd, LLC

[57] ABSTRACT

A compliance unit (8) for use in an hydraulic braking system is disclosed which is adapted to absorb hydraulic fluid from a master cylinder (1) during normal braking and, in the event that a fault in the braking system is detected the unit is adapted to return fluid to the master cylinder (1). The compliance unit (8) therefore effectively decreases its compliance in the event of a fault. The unit (8) may comprise a pair of pistons (14, 15) working in a stepped bore against a first and second biasing force, with a third variable biasing force provided to cancel out the second biasing force during normal operation to provide an increased compliance.

16 Claims, 2 Drawing Sheets

HYDRAULIC BRAKING SYSTEMS

CROSS-REFERENCE TO RELATED APPLICATIONS

This application is a continuation of copending International Application PCT/GB98/00957 filed on Apr. 1, 1998, which designated the U.S., and which claims priority to Great Britain Application No. 9706955.3, filed Apr. 5, 1997.

BACKGROUND OF THE INVENTION

This invention relates to improvements in hydraulic braking systems of the brake-by-wire type, in which under normal braking, the supply of hydraulic fluid to a wheel brake is controlled by an electrically operated actuator adapted to operate in response to an electrical signal from a pedal-operated transducer indicative of braking demand.

It is known in such a brake-by-wire system to provide a manual hydraulic back up which allows hydraulic fluid to be pushed through to the wheel brake in the event of an electrical failure. Typically, such a back-up comprises a pedal operated master cylinder connected to the brake via an isolator valve. During normal operation the isolator valve is closed so that the master cylinder and brake are isolated from each other, and hydraulic pressure is generated at the brake by the electrically operated actuator. In the event of a fault, the isolator valve is opened to connect the master cylinder to the brake to allow manual generation of hydraulic braking pressure to be applied to the brake.

In order to allow for adequate "pedal feel" it is also known in such a system to incorporate a compliance unit. The compliance unit, typically in the form of a piston working in a bore against a single biasing spring, is connected to the output of the master cylinder up-stream of the isolator valve. Operation of the brake pedal displaces hydraulic fluid from the master cylinder, which flows into the bore in the compliance unit. The fluid displaces the piston against the biasing spring until an equilibrium point is reached, i.e. where the force applied to the piston by the biasing spring balances the force applied to the piston by the brake fluid. Thus, by tailoring the characteristics of the compliance unit such as the spring force to mimic the compliance of a normal hydraulic braking system, it is possible to provide a realistic pedal force and displacement of the brake pedal during normal braking.

A problem with the use of such a compliance unit arises if there is a fault in the braking system. In this event, the isolator valve is opened to allow manual back-up, but the pedal travel required to operate the brake is excessive because of the combined compliance of the brake and the compliance unit. Nevertheless, this can be overcome to a limited extent by providing a second isolator valve between the compliance unit and the master cylinder which closes when manual back up is required.

A problem with the use of a second isolator valve arises when a fault is detected at a time when the compliance unit is at least partially full of brake fluid i.e. during or immediately after a brake application. In this event, the second isolator valve will effectively trap brake fluid in the compliance unit, leaving a reduced volume of fluid in the master cylinder circuit. This results in an undesirable increase in pedal travel during manual back-up, although it does reduce the overall compliance during back-up.

In accordance with a first aspect of the invention, we provide a compliance unit for use in an hydraulic braking system, said compliance unit being adapted to absorb hydraulic fluid expelled from the master cylinder during normal braking and, in the event that a fault in said braking system is detected, said compliance unit is adapted to return at least a part of said absorbed hydraulic fluid to said master cylinder.

The compliance unit in accordance with the invention is advantageous in that it will automatically return hydraulic fluid absorbed during normal braking to the master cylinder in the event of a fault. This reduces the required pedal travel. In effect, the compliance unit automatically decreases its compliance in the event of a fault.

In a preferred arrangement, said compliance unit comprises a first piston working in a bore, hydraulic fluid from the master cylinder entering the bore to move the piston along the bore in a first direction against a first and second biasing means, said first biasing means being adapted to apply a first biasing force to said first piston and said second biasing means being adapted to apply a second biasing force to said first piston in the event of a fault.

During normal operation, the first piston may therefore only be biased by a force substantially equal to the first biasing force. In the event of a fault, the biasing force applied to the piston may be increased by the amount of the second biasing force.

Preferably, the compliance unit is adapted so that in the event of a fault the combination of the first and second biasing forces applied to the first piston is at least equal to or greater than the maximum force that can be applied to the first piston by the fluid from the master cylinder. This is advantageous in that it ensures that substantially all the fluid is expelled from the compliance unit in the event of a failure.

The first biasing means may comprise a compression spring acting upon said first piston in a direction substantially opposed to the direction in which the force of the fluid from the master cylinder acts upon the piston. Such a spring is simple and reliable, as well as being easy to manufacture.

The bore may comprise a stepped bore having a first and second portion, said first portion being adapted to accommodate said first piston, and said second portion adapted to accommodate at least part of said second biasing means and being of larger diameter than said first portion.

The second biasing means may comprise a stepped piston having a first portion working in said first piston portion of said bore and a second piston portion of a larger diameter working in said second portion of said bore. The stepped piston may be adapted to move along said first bore in the event of a fault to interact with said first piston under the action of said second biasing force. Said second biasing force may be provided by a second spring having a spring force greater than said first spring force.

Normally, the second piston may be biased away from the first piston in the first portion of the bore under the action of a third biasing force. The third biasing force may comprise a hydraulic pressure generated in a cavity defined by a portion of the second piston and the stepped face of the bore. This hydraulic pressure acts to move the second piston against the force of the second spring (the second biasing force). Preferably, the third biasing force exceeds the second biasing force during normal brake operation, and is reduced to zero in the event of a fault.

The third biasing force is preferably generated by introducing hydraulic fluid, for example from a pump, into the cavity during normal braking. In the event of a fault, the hydraulic fluid can be pumped out, or allowed to be forced out under the action of the second spring moving the piston. This is advantageous in that it is a fail-safe arrangement which will work even in the event of electrical failure or loss of hydraulic pressure. A valve may be provided for alternatively connecting the cavity to a pressure source or pressure sink.

A throttle may be provided to limit the rate at which the fluid is expelled from the cavity. The throttle may comprise a restricted orifice in a line between the cavity and the reservoir.

A stop means may be provided in the second bore to limit the displacement of the second piston against the second spring.

The first biasing means may comprise a first spring adapted to act between an end face of the first piston and an end face of the second piston. This is advantageous in that it simplifies the required form of the stepped bore. Alternatively, it could be adapted to act upon the end face of the first piston and a fixed part of the bore.

According to a second aspect of the invention, we provide a hydraulic braking system incorporating a compliance unit in accordance with a first aspect of the invention, said hydraulic braking system comprising a master cylinder connected via an isolator valve to a wheel brake and a brake actuator being adapted to operate in response to an electrical signal from a pedal-operated transducer in turn to control the supply of hydraulic fluid to said wheel brake, said compliance unit being in permanent fluidic communication with an output of said master cylinder, and in which said isolator valve is closed during normal braking to isolate the master cylinder from the wheel brake, and in the event of a fault said isolator valve is opened to provide fluidic communication between the master cylinder and the wheel brake.

Preferably, said isolator valve comprises a normally open electrically operated valve. It may comprise a solenoid-operated valve.

The braking system incorporating one preferred arrangement of the compliance unit may operate as follows.

During normal operation of the braking system, hydraulic fluid is introduced under pressure into the cavity defined by the step in the bore and the step in the second piston.

This hydraulic fluid displaces the second piston away from the first portion of the bore against the second biasing force, effectively substantially cancelling out the second biasing force. The first piston is then free to move within the first portion of the bore against the first biasing force generated by the first spring. Fluid from the master cylinder can be absorbed into the first portion of the bore by displacing the first piston. This provides for adequate brake pedal feel by enabling pedal displacement and generating feedback force through the pedal. The master cylinder is isolated from the brakes at this stage.

In the event of a failure of the braking system or a fault, the master cylinder is connected to the brakes by opening an isolator valve between the master cylinder and the brakes. The pressure in the cavity is reduced at a rate limited by the throttle, which causes the resulting force acting across the stepped piston to cause the stepped piston to move towards the first portion of the bore. Because the second biasing force applied to the stepped piston exceeds the first biasing force, the first piston is moved to expel hydraulic fluid from the first portion of the bore, returning it to the master cylinder.

The combined force acting upon the first piston to expel the hydraulic fluid exceeds the maximum pressure that can be generated by the master cylinder, and so the piston can no longer be moved along the bore by the hydraulic fluid in this mode.

This ensures that brake pedal travel is reduced and that no fluid is lost to the compliance unit during manual braking.

There will now be described, by way of example only, an embodiment of the present invention with reference to the accompanying drawings in which:

BRIEF DESCRIPTION OF THE SEVERAL VIEW OF THE DRAWING

FIG. 1 is a view of the braking system incorporating a compliance unit in accordance with a first aspect of the present invention during normal electronically controlled braking; and FIG. 2 is a view similar to that shown in FIG. 1 in which the manual back-up mode has been activated.

DETAILED DESCRIPTION OF THE INVENTION

Figure 1:
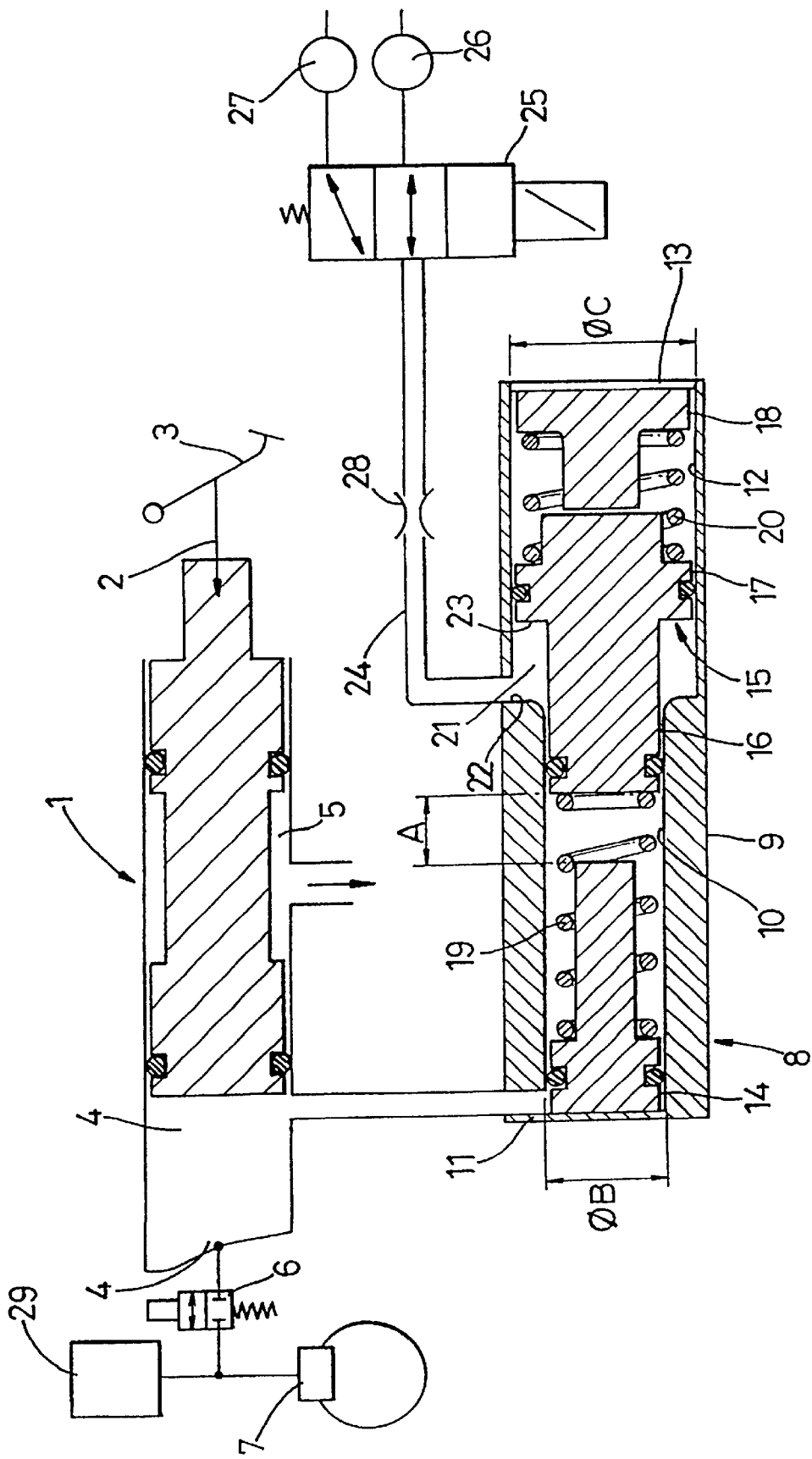
Figure 2:
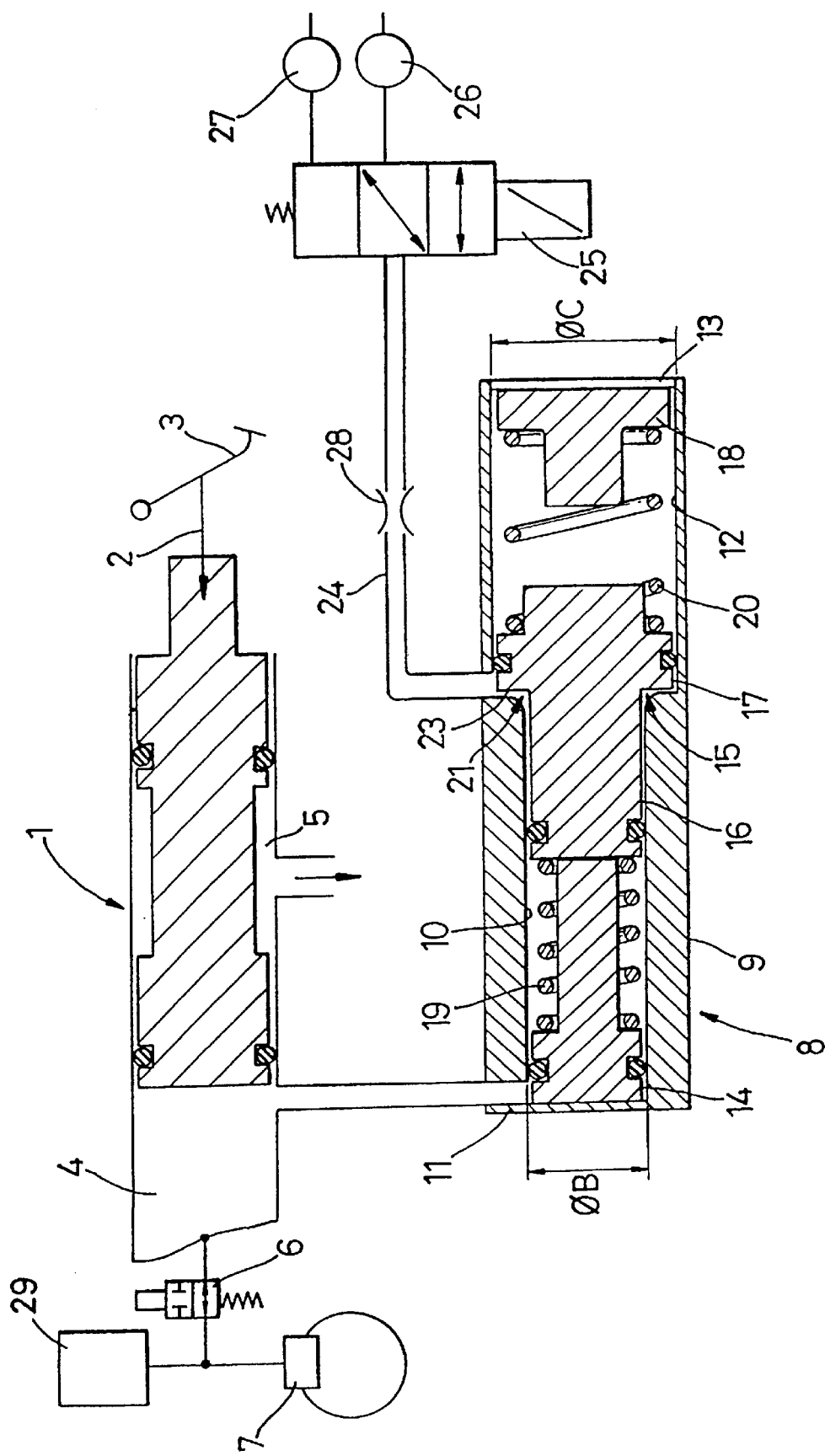

The braking system illustrated in the Figures comprises a tandem master cylinder 1 operated via a plunger 2 connected to a brake pedal 3. The master cylinder 1 is connected to two brake circuits which work in tandem, although only a single circuit is illustrated and described herein.

One chamber 4 of the master cylinder 1 (the second chamber 5 is connected to a master cylinder reservoir connection not shown) is connected to a normally opened isolator valve 6 and thereafter to one or more electrically operated brake assemblies of the kind which an electrical signal from a pedal operated transducer is adapted to operate an electrically controlled actuator in turn to control the hydraulic pressure at a wheel brake 7. Because the isolator valve 6 is of the normally open kind, in the event of a failure the master cylinder 1 will be connected to the brake. An electrically controlled actuator 29 is connected to the brake 7 between the wheel brake and the isolator valve 6 (i.e. downstream from the isolator valve 6).

The output of the first chamber 4 of the master cylinder 1 is also connected to a compliance unit 8 upstream of the isolator valve 6. The compliance unit comprises a housing defining a stepped bore. A first portion 10 of the stepped bore has a first diameter ØB and is connected to the master cylinder 1 adjacent its closed end 11. A second portion 12 of the stepped bore is of a larger diameter ØC than said first portion 10 and has a second closed end 13.

A first piston 14 is adapted to work within the first portion 10 of the stepped bore. A seal is provided between the piston and the wall of the first bore. A second piston 15 is provided which has a stepped outline defining a first piston part 16 and a second piston part 17. The first piston part 16 works within the first portion 10 of the stepped bore, and is provided with a seal between the over wall of the piston 16 and the wall of the first bore 10. The second piston part 17 works within the second portion 12 of the stepped bore and a seal is provided between the part 17 and the second bore 12. An end stop 18 is provided at the end 13 of the second portion 12 of the bore to limit movement of the second stepped piston 15 away from the first portion 10 of the bore.

The first piston 14 is connected to the second piston 15 by a first spring 19 adapted to generate a first biasing force. The second piston 15 is also biased towards the first piston 14 by a second spring 20 acting upon the end stop 18 in the second bore 12. The spring force of the second spring 20 is chosen to be greater than the spring force of the first spring 19.

A cavity 21 is defined by the stepped face 22 of the stepped bore and the stepped face 23 of the second piston 15. The cavity 21 is connected via an hydraulic line 24 to a valve assembly 25 and thereafter to either a source of hydraulic fluid 26 or a reservoir 27. Depending on the operation of the valve assembly, hydraulic fluid can be either pumped into or drawn from the cavity 21. A throttle 28 is provided between the cavity 21 and the valve assembly 25 to limit the rate of change of volume of fluid in the cavity 21.

FIG. 1 shows the braking system during normal braking operation. As shown, the isolator valve 6 is closed to isolate the chamber 4 of the master cylinder 1 from the brake assembly 7. The valve assembly 25 is operated so that pressurised fluid is applied to the cavity 21. This pressurised fluid acts upon the stepped face 23 of the second piston 15 to bias the second piston 15 against the spring force of the second spring 20 into contact with the end stop 18. The valve assembly 25 is adapted so that if it faults the cavity is connected to the reservoir 27.

When the brakes are not applied (i.e. the brake pedal 3 is in its inoperative position), as shown in FIG. 1, the first piston 14 is biased towards the closed end 11 of the first bore 10 under the force of the first spring 19. On application of the brakes, by depressing the brake pedal 3, fluid from the master cylinder 1, which is prevented from reaching the wheel brake 7 due to the closed isolator valve 6, can be absorbed by the compliance unit 8 into the first bore 10, thereafter displacing the piston 14 against the spring force of the first spring 19. The maximum volume of fluid which can be absorbed depends on the bore cross-sectional area ØB and the spacing A between the first 14 and second pistons 15.

In the event that a fault is detected, or if an electrical failure occurs, the isolator valve 6 is opened to connect the master cylinder 1 to the wheel brake 7 and the valve assembly 25 will operate to connect the cavity 21 to the reservoir 27. The pressurised fluid in the cavity 21 is then exhausted via the throttle 28, which allows the second spring 20 to act upon the second piston 15 to displace it towards the first piston 14 in the first portion 10 of the bore because the force of the second spring 20 exceeds the first spring force.

The combined spring forces acting upon the first piston 14 are chosen so as to support a desired maximum braking pressure and therefore minimum achievable vehicle deceleration that can be applied by the master cylinder 1 by the driver, and so any fluid absorbed by the compliance unit 8 is returned to the master cylinder 1. This minimises pedal travel required during back-up operation of the wheel brake 7.

The throttle 28 prevents sudden movement of the second piston (and thereafter the first piston) which could cause a pressure spike to be developed in the master cylinder 1. This helps to ensure a smooth transition from normal to manual back-up braking, preventing possible loss of control due to driver error.

What is claimed is:

1. A compliance unit for use in an hydraulic braking system incorporating a master cylinder, said compliance unit being connected to the output o said master cylinder and adapted to absorb hydraulic fluid expelled from said master cylinder during normal braking, wherein said braking system is of the brake-by-wire type and in the event that a fault in said braking system is detected, said compliance unit is adapted to return at least a part of said absorbed hydraulic fluid to said master cylinder.

2. A compliance unit according to claim 1, including first and second biasing means, wherein said compliance unit comprise a first piston working in a bore adapted so that hydraulic fluid from said master cylinder entering said bore moves said piston along said bore in a first direction against said first and second biasing means, said first biasing means being adapted to apply a first biasing force to said first piston, and said second biasing means being adapted to apply a second biasing force to said first piston in the event of a fault.

3. A compliance unit according to claim 2, wherein said first piston is biased by a force substantially equal to said first biasing force during normal operation and in the event of a fault, said biasing force applied to said first piston is increased by the amount of said second biasing force.

4. A compliance unit according to claim 2, wherein in the event of a fault the combination of said first and second biasing forces applied to the first piston is at least equal to or greater than the maximum force that is applied to the first piston by the fluid from said master cylinder.

5. A compliance unit according to claim 4, wherein said first biasing means comprises a compression spring acting upon said first piston in a direction substantially opposed to the direction in which the force of said fluid from said master cylinder acts upon said piston.

6. A compliance unit according to claim 2, wherein said bore comprises a stepped bore having a first and a second portion, said first portion being adapted to accommodate said first piston, and said second portion adapted to accommodate at least part of said second biasing means and being of larger diameter than said first portion.

7. A compliance unit according to claim 6, wherein said second biasing means comprises a stepped piston having a first piston portion working in said first portion of said bore and a second piston portion of a larger diameter working in said second portion of said bore.

8. A compliance unit according to claim 7, wherein said stepped piston is adapted to move along said first bore portion in the event of a fault to interact with said first piston under the action of said second biasing force.

9. A compliance unit according to claim 8, wherein said second biasing force is provided by a second spring having a spring force greater than said first biasing force.

10. A compliance unit according to claim 8, wherein during normal operation said stepped piston is biased away from said first piston in said first portion of said bore under the action of a third biasing force.

11. A compliance unit according to claim 10, wherein third biasing force comprises a hydraulic pressure generated in a cavity defined by a portion of said second piston, and said stepped face of said bore which acts to move the second piston against the force of said second biasing force.

12. A compliance unit according to claim 10, wherein said third biasing force exceeds the second biasing force during normal brake operation, and is reduced substantially to zero in the event of a fault.

13. A compliance unit according to claim 11, wherein said third biasing force is generated by introducing hydraulic fluid into said cavity during normal braking and in the event of a fault, said hydraulic fluid is pumped out or forced out under the action of said second spring moving said piston.

14. A compliance unit according to-claim 11, wherein a valve is provided for alternatively connecting said cavity to a pressure source and a pressure sink.

15. An hydraulic braking system incorporating a compliance unit, said hydraulic braking system comprising a wheel brake, an isolator valve, a master cylinder connected via said isolator valve to said wheel brake, a brake actuator adapted to operate in response to an electrical signal from a pedal-operated transducer in turn to control the supply of hydraulic fluid to said wheel brake, wherein said compliance unit is in permanent fluidic communication with an output of said master cylinder, and wherein said isolator valve is closed during normal braking to isolate said master cylinder from said wheel brake, and in the event of a fault said isolator valve is opened to provide fluidic communication between said master cylinder and said wheel brake, said compliance unit being adapted to absorb hydraulic fluid expelled from said master cylinder during normal braking, and wherein said braking system is of the brake-by-wire type and in the event that a fault in said braking system is detected, said compliance unit is adapted to return at least a part of said absorbed hydraulic fluid to said master cylinder.

16. An hydraulic braking system according to claim 15, wherein said isolator valve comprises a normally open electrically operated valve.

* * * * *